(12) United States Patent
Ross et al.

(10) Patent No.: US 10,921,960 B2
(45) Date of Patent: Feb. 16, 2021

(54) MAPPING GEOLOGICAL FEATURES USING FACIES-TYPE DATA MANIPULATION

(75) Inventors: William C. Ross, Littleton, CO (US); Richard L. Chambers, Bixby, OK (US)

(73) Assignee: Landmark Graphics Corporation, Houston, TX (US)

( * ) Notice: Subject to any disclaimer, the term of this patent is extended or adjusted under 35 U.S.C. 154(b) by 928 days.

(21) Appl. No.: 14/234,108

(22) PCT Filed: Jul. 22, 2011

(86) PCT No.: PCT/US2011/044933
§ 371 (c)(1), (2), (4) Date: Jan. 21, 2014

(87) PCT Pub. No.: WO2013/015764
PCT Pub. Date: Jan. 31, 2013

(65) Prior Publication Data
US 2014/0223351 A1    Aug. 7, 2014

(51) Int. Cl.
*G01V 99/00* (2009.01)
*G06F 3/0484* (2013.01)

(52) U.S. Cl.
CPC ............ *G06F 3/0484* (2013.01); *G01V 99/00* (2013.01); *G01V 2210/661* (2013.01); *G01V 2210/74* (2013.01)

(58) Field of Classification Search
CPC ......... G09B 25/06; G06T 17/00; G06F 19/00; G06F 17/30241
USPC ........... 715/771, 964; 702/16; 706/919, 920, 706/929; 703/6
See application file for complete search history.

(56) References Cited

U.S. PATENT DOCUMENTS

| | | | |
|---|---|---|---|
| 4,646,240 A * | 2/1987 | Serra et al. .................. | 702/11 |
| 6,070,125 A | 5/2000 | Murphy et al. | |
| 6,985,606 B1 | 1/2006 | Wilkinson | |
| 7,054,753 B1 | 5/2006 | Williams et al. | |
| 2001/0027456 A1 | 10/2001 | Lancaster et al. | |

(Continued)

FOREIGN PATENT DOCUMENTS

| | | |
|---|---|---|
| CN | 101051394 A | 10/2007 |
| CN | 102103758 A | 6/2011 |

(Continued)

OTHER PUBLICATIONS

Modelling Subsurface Heterogeneity by Coupled Markov Chains: Directional Dependency, Walther's Law and Entropy (publihsed in 2005) https://link.springer.com/article/10.1007/s10706-004-2899-z.*

(Continued)

*Primary Examiner* — Rinna Yi
(74) *Attorney, Agent, or Firm* — Tenley Krueger; Parker Justiss, P.C.

(57) ABSTRACT

Methods, computer readable medium, and systems for mapping geologic features are described. In one example, a selection of a template describing a theoretical geologic depositional profile is received. In addition, paleo-elevations and/or paleo-depths of actual geologic facies in an actual geologic depositional profile are received. A graphical map that represents the actual geologic depositional profile is generated by mapping the received paleo-elevations and/or paleo-depths onto the theoretical depositional profile.

22 Claims, 8 Drawing Sheets

(56) References Cited

U.S. PATENT DOCUMENTS

| | | | |
|---|---|---|---|
| 2006/0015260 | A1 | 1/2006 | Masson et al. |
| 2008/0126048 | A1 | 5/2008 | Labourdette |
| 2009/0043507 | A1 | 2/2009 | Dommisse et al. |
| 2010/0257004 | A1 | 10/2010 | Perlmutter et al. |
| 2012/0029827 | A1* | 2/2012 | Pepper .............. G01V 1/282 702/16 |
| 2012/0029828 | A1* | 2/2012 | Pepper .............. G01V 1/301 702/16 |

FOREIGN PATENT DOCUMENTS

| | | |
|---|---|---|
| RU | 2223521 | 2/2004 |
| WO | WO 99/28767 | 6/1999 |
| WO | WO 2010/076638 A2 | 7/2010 |

OTHER PUBLICATIONS

Authorized Officer Lee W. Young, PCT International Search Report and Written Opinion of the International Searching Authority, PCT/US2011/044933, dated Dec. 12, 2011, 8 pages.

Middleton, "Johannes Walther's Law of the Correlation of Facies", Geological Society of America Bulletin, vol. 84, Mar. 1973, pp. 979-988.

Authorized Officer Agnes Wittmann-Regis, PCT International Preliminary Report on Patentability, PCT/US2011/044933, dated Feb. 6, 2014, 7 pages.

Authorized Officer O.V. Kishkovich, Patent Search Report, Eurasian Patent Office, Eurasian Application No. 201490291, 2 pages.

Patent Examiner Mladen Mitic, Australian Patent Examination Report No. 1, AU Application No. 2011373665, dated May 28, 2014, 3 pages.

Canadian Office Action, Canadian Application Serial No. 2,839,857, dated Mar. 24, 2015, 3 pages.

Extended European Search Report, European Application No. 11869975.0, dated Oct. 23, 2015, 7 pages.

GCC Patent Office, Examination Report, dated Nov. 16, 2015, 4 pages.

The State Intellectual Property Office of the People's Republic of China, Notice on the First Office Action, dated Jan. 14, 2016, 13 pages.

* cited by examiner

MAPPING GEOLOGICAL FEATURES USING FACIES-TYPE DATA MANIPULATION

This application is a U.S. National Phase Application of, and claims the benefit of priority to, PCT Application Serial No. PCT/US2011/044933, filed on Jul. 22, 2011 and entitled "Mapping Geologic Features", the contents of which are hereby incorporated by reference.

TECHNICAL BACKGROUND

This disclosure relates to interpreting and mapping facies-type data.

BACKGROUND

In geology, facies refers to a body of rock, such as a distinctive rock unit that forms under certain conditions of sedimentation, reflecting a particular process or environment. Walther's Law of Facies states that the vertical succession of facies reflects lateral changes in environment. In other words, when a depositional environment migrates laterally, sediments of one depositional environment come to lie on top of another. A facies map is a stratigraphic map indicating a distribution of sedimentary facies within a specific geologic unit. Facies maps are useful to both production and exploration geologists, as such maps may provide information about the predicted depositional environment and specific facies of sedimentary rocks within a prospective exploration area or within a field under development or both. Using facies maps, geologists can predict reservoir, source, and seal rocks.

Certain facies mapping techniques utilize geo-statistical techniques, for example, indicator Kriging, to determine a boundary or boundaries between two or more input facies categories. Alternatively, probabilistic simulation algorithms employ facies succession principles (e.g., Walther's Law) to predict facies, for example, by calculating facies occurrence uncertainties determined by running multiple realizations.

DETAILED DESCRIPTION

Figure 1:
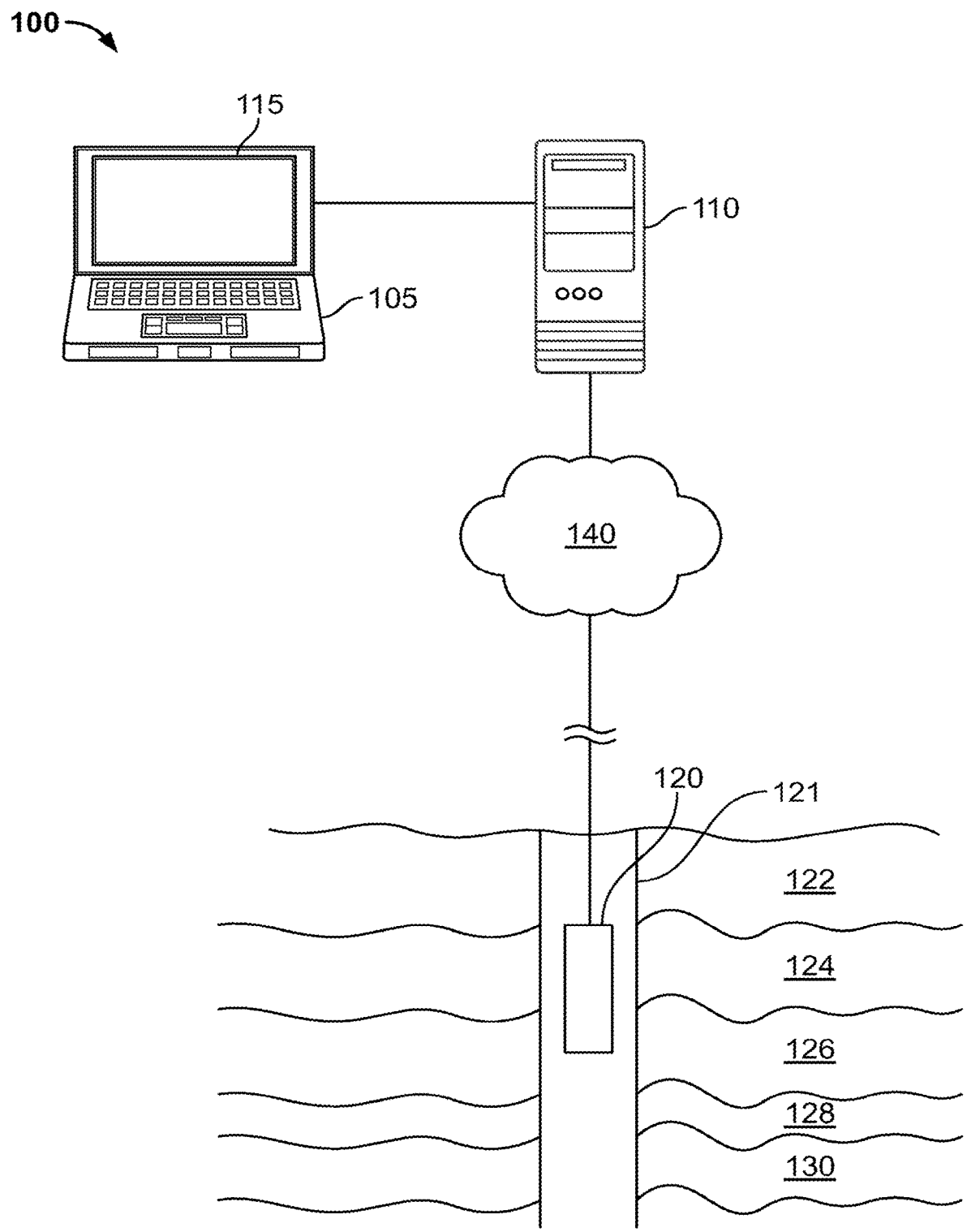
FIG. 1 is an example of a geologic facies-type data manipulation system.

This document describes techniques embodied in a computer-implemented method, a system, an apparatus, and a storage media for generating a graphical map that represents geologic depositional profiles that include multiple facies. The map of the actual geologic profile is generated by fitting paleo-elevations and/or paleo-depths measured for actual facies in the profile onto a theoretical geologic profile. The techniques are wholly deterministic and directly simulate a facies succession as a paleo-environmental or paleo-elevation ramp, thereby allowing primary facies to be mapped as a continuous regional variable using any conventional gridding technique. By enabling fitting primary facies data to the theoretical depositional profile, the methods can leverage both the interpolation and extrapolation powers of Walther's Law.

In general, an innovative aspect of the subject matter described here can be implemented as a method for mapping geologic data performed with one or more computing systems. A selection of a template describing a theoretical geologic depositional profile representing an arrangement of multiple theoretical geologic facies is received in a user interface. A paleo-elevation or a paleo-depth relative to sea level of an actual facies in an actual geologic depositional profile is received in the user interface. The paleo-elevation or the paleo-depth of the actual facies is mapped to the theoretical geological profile in accordance with Walther's Law. A graphical map representing the actual geologic depositional profile is generated based on the mapping. The generated graphical map is displayed in the user interface.

This, and other aspects, can include one of more of the following features. Multiple templates that each describes a corresponding geologic profile representing a corresponding arrangement of multiple theoretical geologic facies can be generated. The multiple templates include the selected template. Receiving the selection of the template can include presenting multiple unique templates including multiple theoretical geologic depositional systems in the user interface. The received selection can be one of the multiple unique templates. In response to receiving the selection of the template, an image of the theoretical geologic depositional profile can be displayed in the user interface. Mapping the paleo-elevation or the paleo-depth of the actual facies to the theoretical geologic profile can include correlating the received paleo-elevation or paleo-depth of the actual facies to the theoretical geologic facies.

Another paleo-elevation or paleo-depth of another actual facies in the actual geologic depositional profile can be received in the user interface. Correlating the received paleo-elevation or paleo-depth of the actual facies to the theoretical geologic facies can include determining a corresponding theoretical paleo-elevation or paleo-depth for a theoretical facies in the theoretical geologic profile that corresponds to the actual facies. Determining the corresponding paleo-elevation or paleo-depth can include interpolating the theoretical paleo-elevation or paleo-depth for the corresponding theoretical facies based on the received paleo-elevation or paleo-depth. Determining the corresponding paleo-elevation or paleo-depth can include extrapolating the theoretical paleo-elevation or paleo-depth for the corresponding theoretical facies based on the received paleo-elevation or paleo-depth.

Multiple paleo-elevations or paleo-depths relative to sea level of a corresponding multiple actual facies in the actual geologic depositional profile can be received. The multiple paleo-elevations or paleo-depths can be mapped to the theoretical geologic profile in accordance with Walther's Law. Mapping the multiple paleo-elevations or paleo-depths to the theoretical geologic profile can include building a table having at least one of a row or column including descriptions of the multiple actual geologic facies and at least one of a corresponding row or column including the corresponding paleo-elevations or paleo-depths.

Input to position one or more secondary facies in the actual geologic depositional profile can be received. In response to receiving the input, one or more objects that represent corresponding one or more secondary facies can be displayed in the graphical map. The one or more secondary facies can include at least one of a river, a submarine fan, or a channel. The one or more secondary facies can be modeled based on object metrics included in the selected template.

Another innovative aspect of the subject matter described here can be implemented as an apparatus including a non-transitory and tangible computer readable media, the media including instructions operable when executed to cause one or more computing systems to perform the operations described above. A further innovative aspect of the subject matter described here can be implemented as a computing system that includes one or more memory modules, one or more processors, a graphical user interface, and a geologic mapping tool stored on one or more of the memory modules, the geologic mapping tool operable when executed by the one or more processors to perform the operations described above.

In one or more embodiments of a geologic mapping tool according to the present disclosure may include one or more of the following features. For example, the geologic mapping tool may leverage Walther's law logic is thus leveraged in an interpretive process. The geologic mapping tool may also use paleo-water depths and elevations to perform paleo-environmental mapping. For instance, the geologic mapping tool may fit depth value points (e.g., paleo-water depth and elevation) to a theoretical paleo-depositional profile. The theoretical profile, calibrated to real, interpreted facies-control-points, may thus provide a tool for facies interpolation and extrapolation. The geologic mapping tool may therefore provide for powerful reservoir prediction capabilities. The geologic mapping tool may also map secondary facies through by secondary variables (e.g., local environmental factors or auto-cyclic variations in channel or submarine fan positioning). As another example, the geologic mapping tool may provide for a wholly deterministic and direct simulation of a facies succession as a paleo-environmental, or paleo-elevation "ramp." The simulation may allow "primary" facies to be mapped as a continuous regional variable using any conventional gridding technique. The geologic mapping tool may thus fit primary facies data to the theoretical depositional profile contained on the facies template. Such a tool may therefore fully leverage both the interpolation and extrapolation powers of Walther's law. The geologic mapping tool may model secondary facies by constraining a strike- and dip-wise extent of specific secondary facies objects (e.g., channels, incised valleys and submarine fans facies) by their interpreted position on a background primary facies map. Therefore, the geologic mapping tool may map an unlimited number of facies.

FIG. 1 is an example of a geologic facies-type data manipulation system 100. The system 100 can generate geologic facies maps that represent actual geologic depositional profiles by implementing the logic of Walther's Law. In some implementations, the client computer system 105 (for example, a desktop computer, a laptop computer, a personal digital assistant, a tablet computer, and the like) is operatively coupled to a server system 110, which can include one or more computer systems, each configured to execute computer program instructions to cause data processing apparatus to perform operations. FIG. 1 shows a client computer system 105 and a server system 110 as two separate entities. Both systems can be implemented as a single entity. For example, the server system 110 can be incorporated into the client computer system 105.

The server system 110 can provide multiple templates, each describing a theoretical geologic depositional profile, to the client computer system 105 for display. In response to a selection of a template and based on data describing an actual geologic depositional profile, the server system 110 can generate a graphical map representing the actual geologic depositional profile and can provide the generated map to the client computer system 105. The client computer system 105 can display the generated map in the user interface 115. In this manner, the server system 110 implements a tool that leverages the logic of Walther's Law to predict reservoir capabilities.

In some implementations, the server system 110 is configured to provide a user with multiple templates, each representing a theoretical geologic depositional profile. The server system 110 can generate each template based on a prescribed vertical and horizontal facies arrangement that corresponds to documented depositional systems, and which satisfy Walther's Law. The server system 110 can either generate or store previously generated templates, and provide the templates for display in the user interface 115, for example, in response to a request from the client computer system 105.

The client computer system 105 provides a user interface 115 that displays the multiple templates provided by the server system 110. A user, for example, a geologist with knowledge of geologic depositional profiles, can select one of the templates displayed in the user interface 115. The client computer system 105 can transmit the selected template to the server system 110.

The server system 110 is configured to map data describing an actual geologic depositional profile to the theoretical geologic depositional profile represented by the selected template in accordance with Walther's Law of facies. In some implementations, the server system 110 receives the template from the client computer system 105 and additionally receives data describing an actual geologic depositional profile.

For example, the data describing the actual geologic depositional profile can be obtained from a logging tool 120 that is lowered into a well-bore 121 formed in the depositional profile. The profile can include multiple facies (for example, a first facies 122, a second facies 124, a third facies 126, a fourth facies 128, a fifth facies 130, and the like) arranged in a vertical arrangement. The logging tool 120 can be lowered to multiple depths that are different from each other in multiple locations (for example, in multiple well-bores formed in the profile) to obtain data describing the facies in each location. The data can include a paleo-elevation (for non-marine rocks) or a paleo-depth (for marine rocks) relative to sea level, and can also include the vertical and horizontal order in which the facies are arranged. The logging tool 120 can be configured to transmit the obtained data to the server system 110 through one or more networks 140 (for example, the Internet).

The logging tool 120 can be configured to obtain the data describing the actual geologic depositional profile prior to, and often significantly prior to, the mapping. For example, the logging tool 120 can have collected the paleo-elevations and paleo-depths of the multiple facies several years in advance of mapping. Alternatively, or in addition, the paleo-elevations and paleo-depths can be collected manually, for example, by members of a geological team, and stored, for example, on a computer-readable storage medium.

The server system 110 is configured to store the data received from the logging tool. In some implementations, the user of the client computer system 105 can provide the data describing the actual geologic depositional system, for example, through the user interface 115. According to Walther's Law, facies adjacent to one another in a continuous vertical sequence also accumulated adjacent to one another laterally. The server system 110 can be configured to leverage the logic of Walther's law by fitting the theoretical profile to the obtained data. For example, the user can select a facies succession across several contiguous facies. The server system 110 can then impose or transfer the facies succession onto the data obtained from the actual profile. For example, the server system 110 can transfer the facies interpretations of the theoretical profile onto vertical segments of well logs, cross section panels, or seismic sections. Such interpretations carry paleo-elevations or depths that can be used to generate the graphical map.

Using paleo-elevations and/or paleo-depths, the server system 110 performs paleo-environmental (i.e., facies) mapping, for example, by fitting the z-value depth points (paleo-elevation and depth) to the theoretical profile obtained from the template. Thus, the server system 110 serves as a tool for facies interpolation and extrapolation of the theoretical profile, calibrated to real, interpreted facies-control-points resulting in a graphical map. Such a graphical map enables geologists to predict reservoir capabilities.

The arrangement of the facies shown in FIG. 1 represents primary facies that are presumed to be controlled primarily by elevation or water depth. The actual geologic depositional profile can additionally include secondary facies that are controlled by secondary variables, for example, local environmental factors or auto-cyclic variations in channel or submarine fan positioning. In some implementations, the server system 110 can additionally enable modeling the secondary facies, for example, using object metrics stored in the template representing the theoretical geologic depositional profile.

Figure 2:
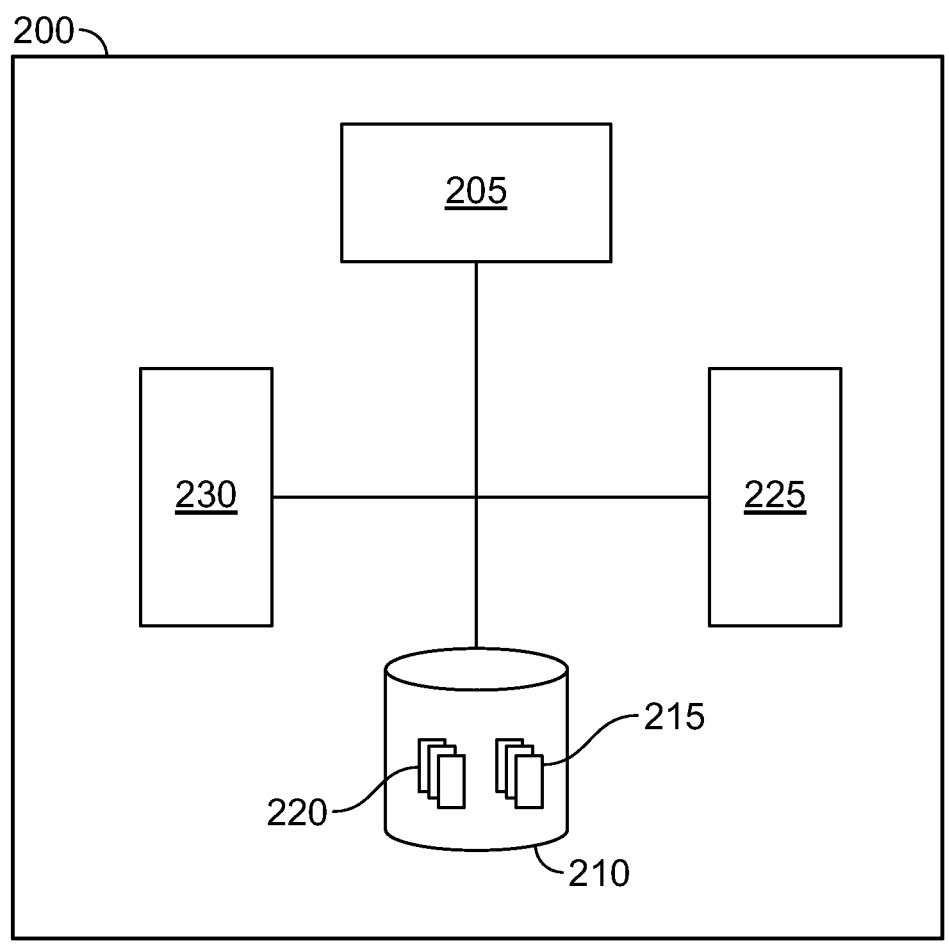
FIG. 2 is an example of a computing system to generate geologic facies maps.

FIG. 2 is an example of a computing system 200 to generate geologic facies maps. In some implementations, the computing system 200 is a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The computing system 200 includes an interface 205 configured to receive information, for example, a template, data describing an actual geologic depositional profile, and the like. The computing system 200 additionally includes a data storage system 210 in which the multiple templates 215 and the well logs 220 can be stored. The computing system 200 further includes a geo-mapping module 225 configured to generate a graphical map, as described above. The geo-mapping module 225 can include computer program instructions executable by the data processing apparatus 230, for example, a microprocessor, to perform the operations of generating the graphical map representing the actual geologic depositional profile.

In some implementations, the computing system 200 can receive the multiple templates 215 from an external source (e.g., a repository, database, or other storage media, not shown). In some implementations, the computing system 200 can be configured to generate the multiple templates that each describes a corresponding theoretical geologic profile. Each theoretical geologic profile, in turn, represents a corresponding arrangement of multiple theoretical geologic facies. In response to a request from a client system, the computing system 200 can transmit the multiple templates through the interface 205 for presenting in a user interface displayed in the client system. Through the interface 205, the computing system 200 can receive a selection of a template that represents a theoretical geologic depositional system.

In some implementations, the storage system 210 stores multiple template images, that each correspond to a theoretical depositional profile. In response to receiving a selection of a template from the client system, the computing system 200 can transmit a template image that corresponds to the selected template to the client system. The client system can display the received image in the user interface. In some implementations, the user of the client system can input data describing the actual geologic profile in the user interface displayed in the client system.

To map the data (for example, the paleo-elevation or the paleo-depth) describing the actual facies to the theoretical geologic profile, the computing system 200 can geo-mapping module 225 can correlate the received paleo-elevation or paleo-depth of the actual facies to a corresponding theoretical geologic facies included in the theoretical geologic depositional profile represented by the selected template. In some situations, the user can provide data describing another actual facies in the actual geologic depositional profile. This additional data can include a paleo-elevation or a paleo-depth of a second actual facies in the actual profile. The computing system 200 can correlate the additional data to a corresponding theoretical geologic facies. In this manner, the computing system 200 can map the paleo-elevations or paleo-depths of both actual facies to the theoretical geologic profile. In some implementations, to correlate a paleo-elevation or a paleo-depth of an actual facies to the theoretical geologic facies, the computing system 200 can determine a corresponding theoretical paleo-elevation or paleo-depth for the theoretical facies. To do so, the computing system 200 can interpolate or extrapolate (or both) the theoretical paleo-elevation or paleo-depth for the corresponding theoretical facies, as provided by the template, based on the received paleo-elevation or paleo-depth of the actual facies.

In some implementations, in addition to receiving a paleo-elevation or paleo-depth of an actual geologic facies in the actual geologic depositional system, the computing system 200 can receive multiple paleo-elevations or paleo-depths relative to sea level of corresponding multiple actual facies in the actual profile. The computing system 200 can map the multiple paleo-elevation or paleo-depths to the theoretical geographical profile in accordance with Walther's Law. To map the multiple paleo-elevations or paleo-depths to the theoretical profile, the computing system 200 can build a table having at least one of a row or column including descriptions of each of the multiple actual geologic facies and at least one of a corresponding row or column including the corresponding paleo-elevation or paleo-depths. The computing system 200 can store the table in storage system 210.

In some implementations, the computing system 200 can additionally receive input to position one or more secondary facies in the actual geologic depositional profile. In response, the computing system 200 can display one or more objects on the graphical map, that each represents a corresponding secondary facies. A secondary facies can be a river or a submarine fan or a channel, for example. The computing system 200 can determine locations of the secondary facies on the graphical map by modeling the secondary facies based on object metrics included in the selected template.

Figure 3:
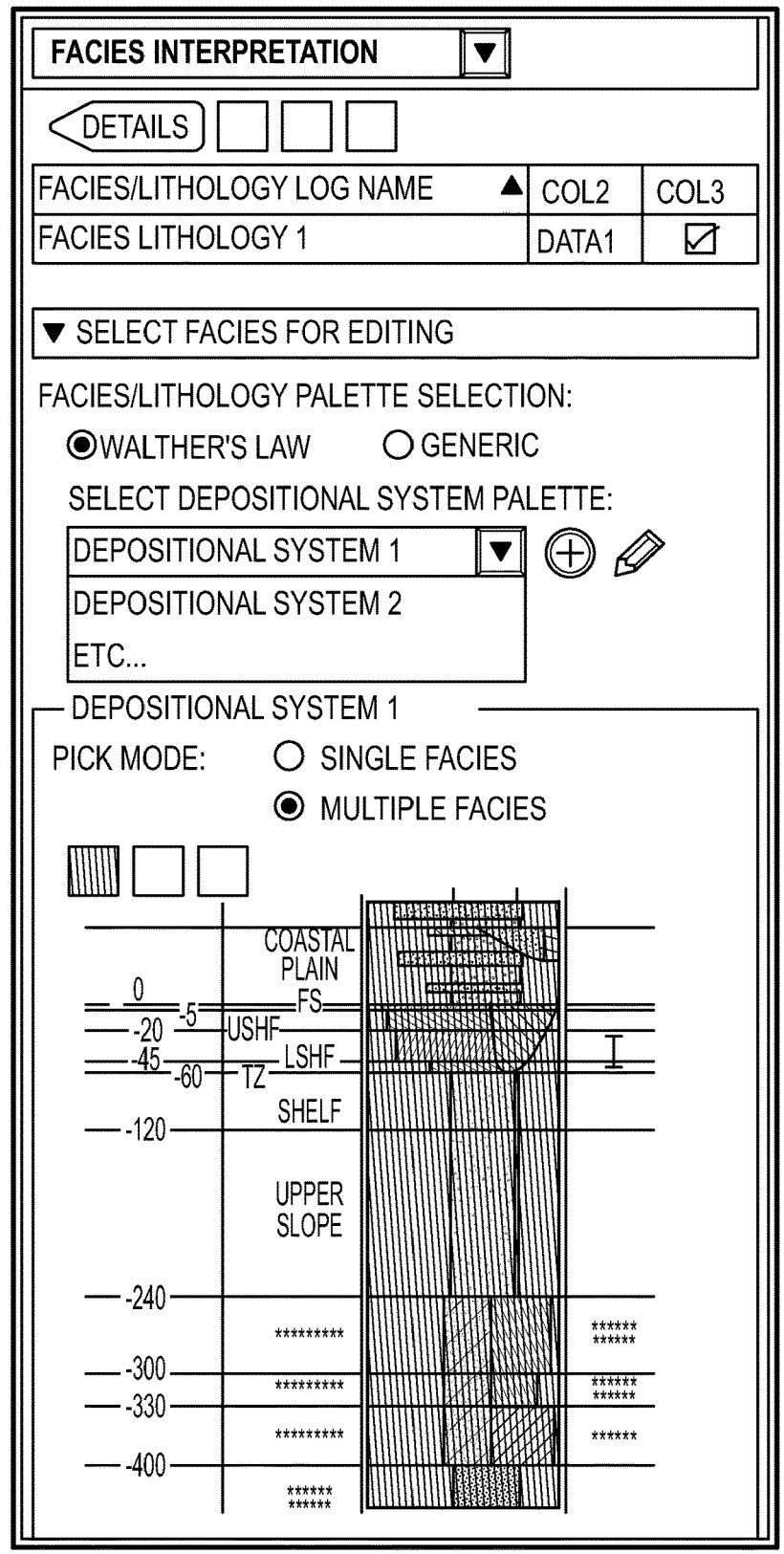
FIG. 3 is an example of a user interface to receive facies interpretation data.

FIG. 3 is an example of a user interface 300 to receive facies interpretation data. In some implementations, the server system (for example, server system 110 shown in FIG. 1) can execute computer program instructions to generate the user interface 300 and to provide the user interface 300 for displaying in a display device connected to the client system. The user interface 300 can display multiple theoretical geologic depositional profiles, for example, in a drop down menu (or otherwise). A user can select one of the theoretical profiles from the drop down menu. The client system can transmit the selected profile to the server system. Upon receiving the selection, the server system can transmit a template image that corresponds to the selected template for displaying in the user interface 300. The template image includes a vertical arrangement of the multiple theoretical facies included in the corresponding theoretical geologic profile. The user interface 300 can additionally enable a user to select either a "Single Facies" mode or a "Multiple Facies" mode, for example, by displaying radio buttons (or other selection features) for the respective modes. In some implementations, the user can additionally provide the data describing one or more actual geographic facies of an actual profile using the user interface 300.

Figure 4A:
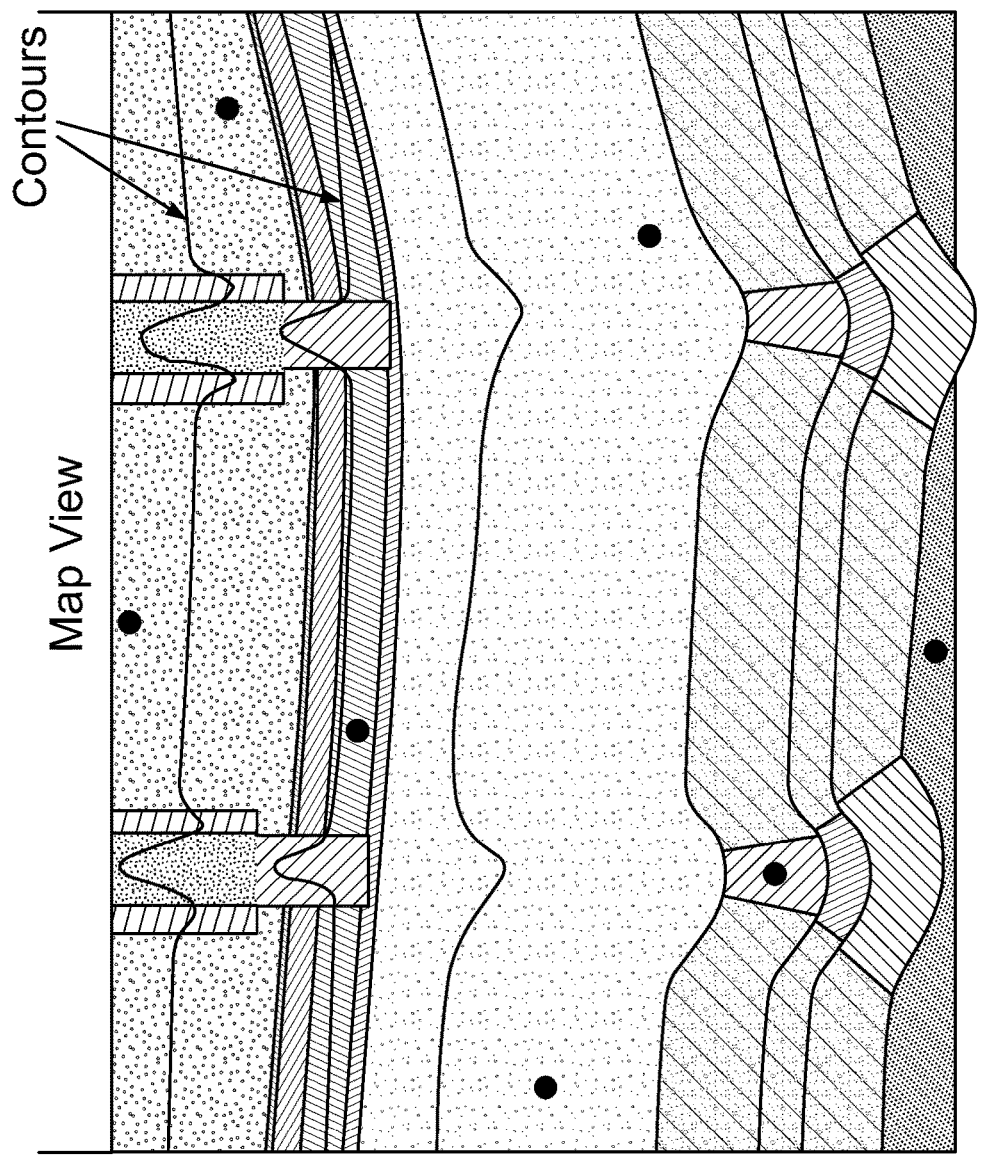
FIGS. 4A-4D are examples of a depositional system facies template including paleo-elevation and paleo-depth data.

FIGS. 4A-4D are examples of a depositional system facies template including paleo-elevation and paleo-depth data. FIG. 4A shows an example graphical map 405 that represents the actual geographical facies, including both primary and secondary facies. The black dots in FIG. 4A represent paleo-elevations or paleo-depths of the actual facies obtained, for example, using the logging tool 120 described in FIG. 1. Each dot represents an observation that translates into depth (for marine rock) or elevation (for non-marine rock). Based on these elevations and depths, using interpolation and/or extrapolation, the map of the actual geologic profile can be generated, for example, by correlating the depths/elevations of the actual facies to corresponding theoretical facies represented by the selected template.

Figure 4B:
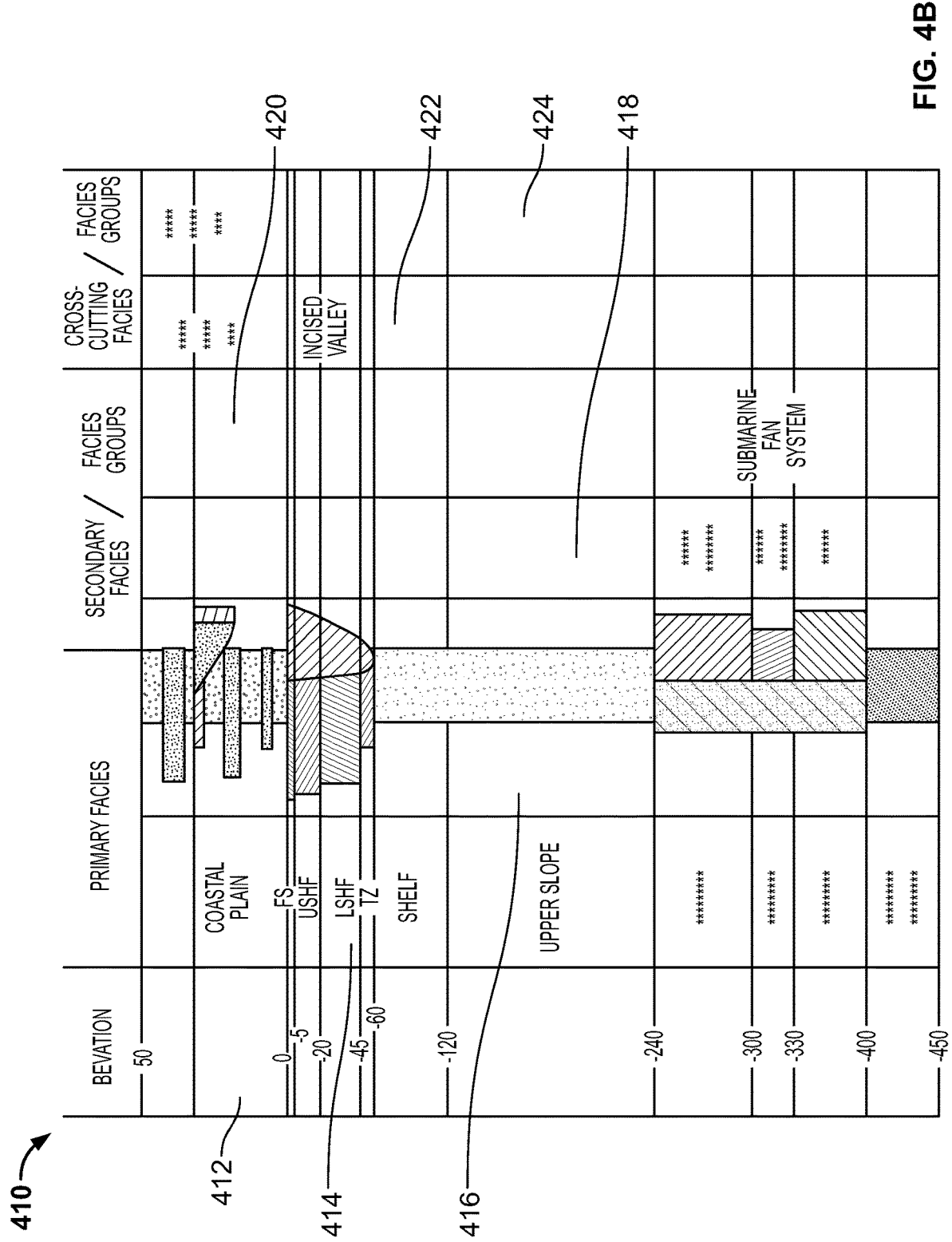

FIG. 4B is an example vertical section 410 that represents a succession of facies that are stacked vertically over time. The figure shows the vertical arrangement of primary and secondary facies together with cross-cutting facies. The vertical section 410 is displayed adjacent to the user interface 300 in the display device. The arrangement of the facies can be displayed across multiple columns (for example, a first column 412, a second column 414, a third column 416, a fourth column 418, a fifth column 420, a sixth column 422, and a seventh column 424). The first column 412 displays paleo-water depths for each facies. The second column 414 displays the names of the facies. The fourth column 418 displays the names of the secondary facies and facies groups. The third column 416 is a graphical depiction of each primary facies displayed in the second column 414 and each secondary, cross cutting facies displayed in the fourth column 418. The fifth column 420, the sixth column 422, and the seventh column 424 display names for the secondary and cross cutting facies.

Figure 4C:
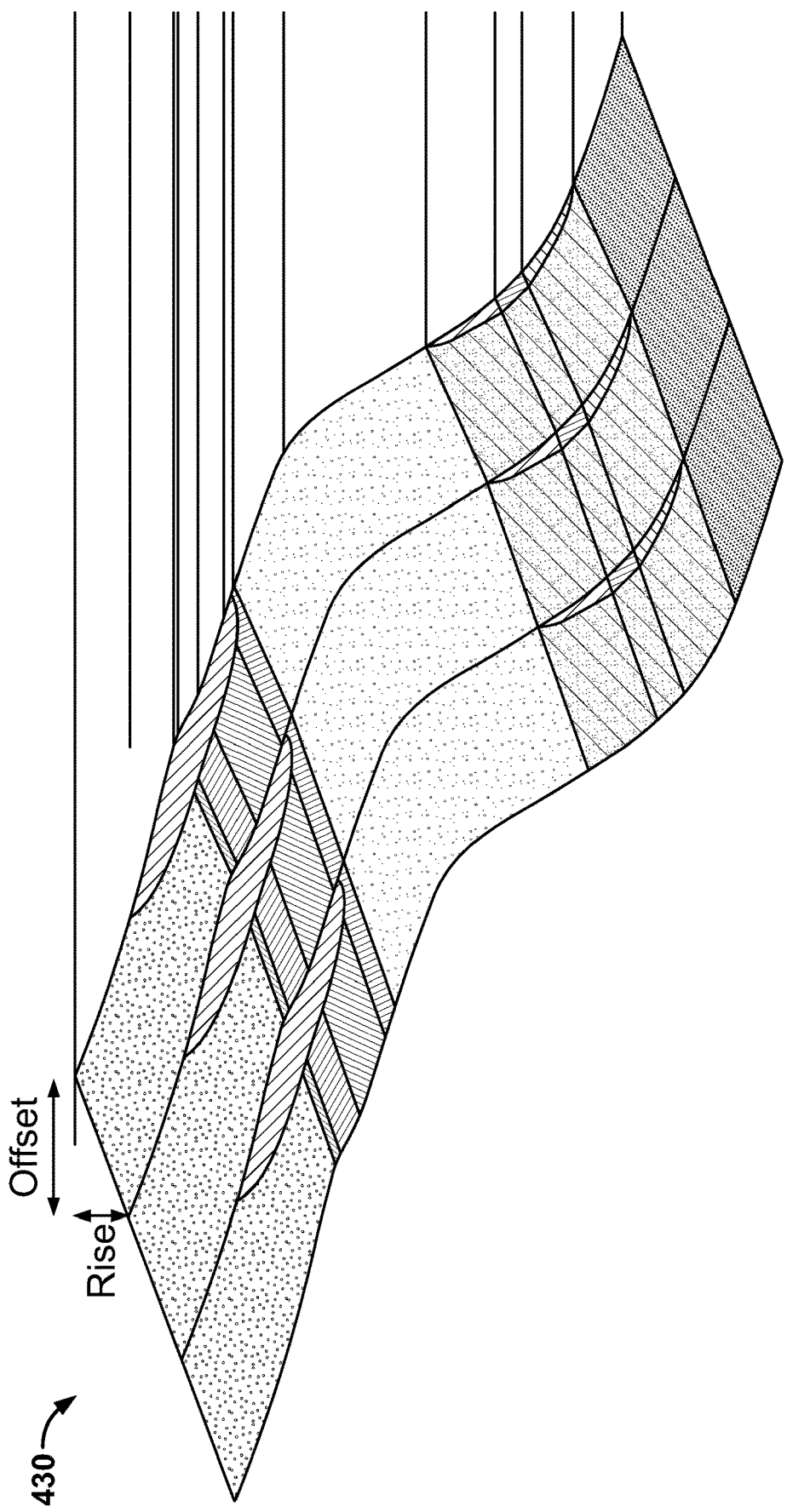
Figure 4D:
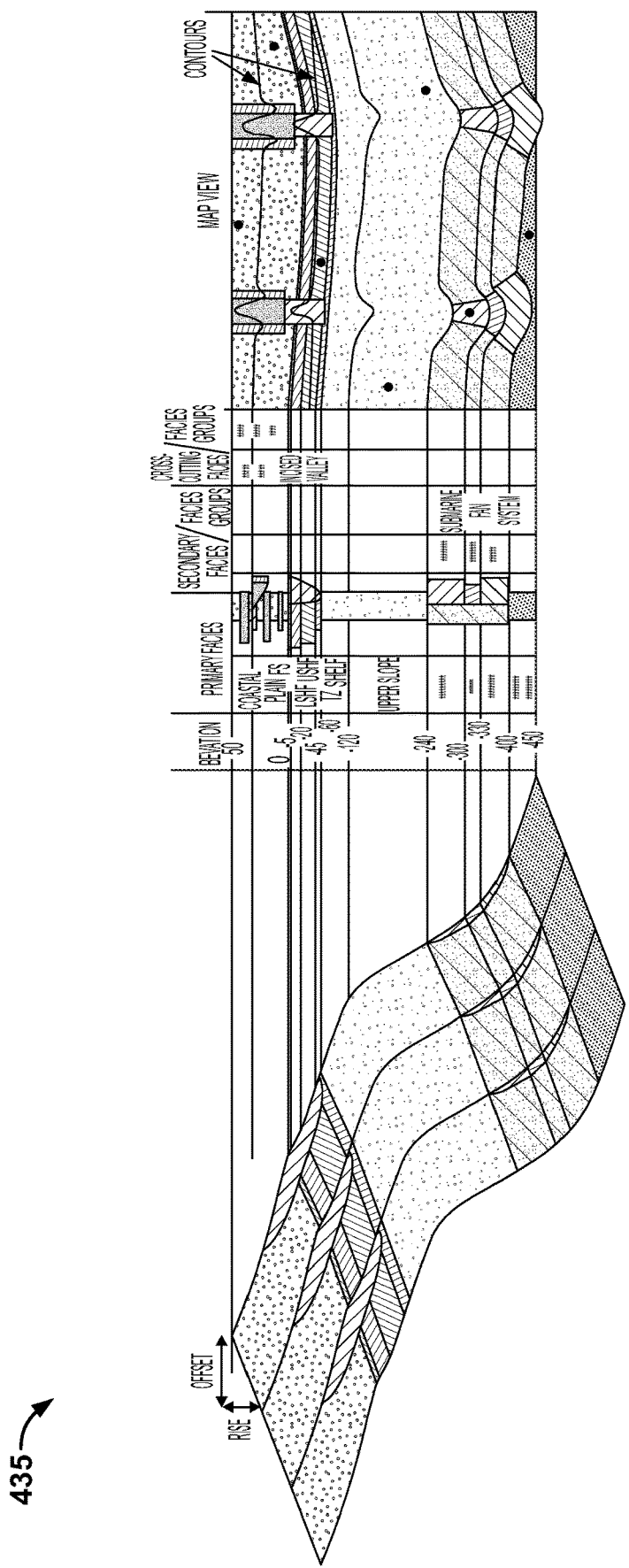

FIG. 4C illustrates an example map 430 that shows a horizontal profile of the vertical arrangement generated in accordance with Walther's Law. FIG. 4D shows an example graphical map 435 representing an actual geologic depositional profile based on mapping the paleo-elevation or paleo-depth of actual facies to a selected theoretical geographical profile in accordance with Walther's Law. The map is created by positioning the maps of FIGS. 4A, 4B, and 4C adjacent to each other.

Figure 5:
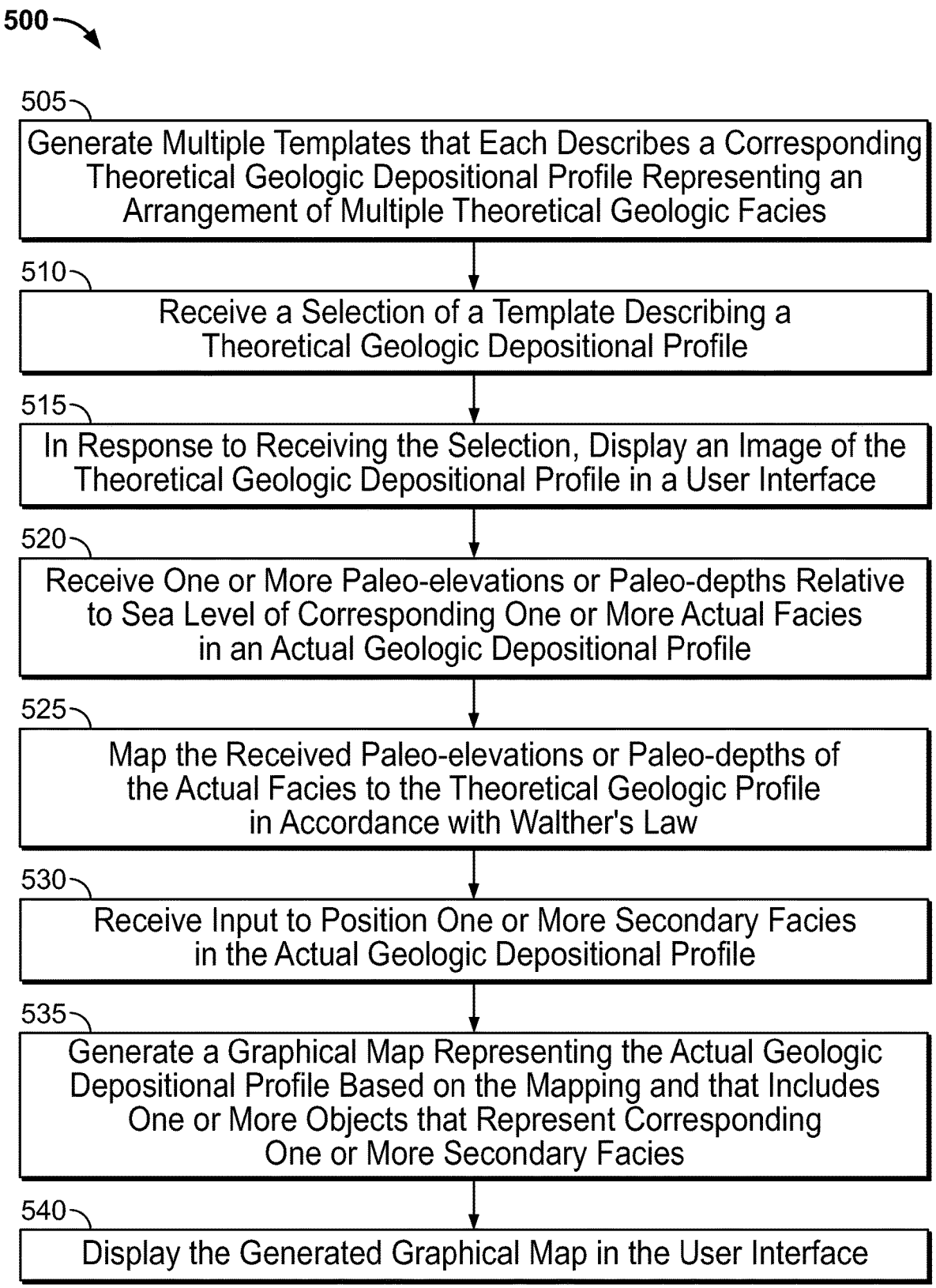
FIG. 5 is a flowchart of an exemplary process for generating a graphical map representing an actual depositional profile generated from a theoretical depositional profile.

FIG. 5 is a flowchart of an exemplary process 500 for generating a graphical map representing an actual depositional profile generated from a theoretical depositional profile. The process 500 can be implemented as computer program instructions stored on a tangible computer-readable medium and executable by data processing apparatus. The process 500 generates multiple templates that each describes a corresponding theoretical geologic depositional profile representing an arrangement of multiple theoretical geologic facies (step 505). The process 500 receives a selection describing a theoretical geologic depositional profile (step 510). For example, in some implementations, step 505 may include or be implemented by presenting in the user interface multiple unique templates including multiple theoretical geologic depositional systems. The received selection can be one of the multiple unique templates.

In response to receiving the selection, the process 500 displays an image of the theoretical geologic depositional profile in a user interface (step 515). The process 500 receives one or more paleo-elevations or paleo-depths relative to sea level of corresponding one or more actual facies in an actual geologic depositional profile (step 520). The process 500 maps the received paleo-elevations or paleo-depths of the actual facies to the theoretical geologic profile in accordance with Walther's Law (step 525). For example, in some implementations, step 515 may include or be implemented by correlating the received paleo-elevations or paleo-depths of the actual facies to the theoretical geologic facies. In some implementations, the correlating can include or be implemented by determining a corresponding theoretical paleo-elevation or paleo-depth for a theoretical facies in the theoretical geologic profile that corresponds to the actual facies, for example, by interpolation or by extrapolation or both. In some implementations, step 515 may include or be implemented by building a table having at least one of a row or column including descriptions of the multiple actual geologic facies and at least one of a corresponding row or column including the corresponding paleo-elevations or paleo-depths.

The process 500 receives input to position one or more secondary facies in the actual geologic depositional profile (step 530). For example, in some implementations, the one or more secondary facies can include at least one of a river, a submarine fan, or a channel. The one or more secondary facies can be modeled, in some implementations, based on object metrics included in the selected template. The process 500 generates a graphical map representing the actual geologic depositional profile based on the mapping and that includes one or more objects that represent corresponding one or more secondary facies (step 535). The process 500 displays the generated graphical map in the user interface (step 540).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user. All or portions of the display device can include a touch screen or any touch-sensitive user interface. The computer can also include a keyboard and a pointing device, for example, a mouse or a trackball or touch pad, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. For example, other methods described herein besides those, or in addition to those, illustrated in FIG. 5 can be performed. Further, the illustrated steps of process 500 can be performed in different orders, either concurrently or serially. Further, steps can be performed in addition to those illustrated in process 500, and some steps illustrated in process 500 can be omitted without deviating from the present disclosure. In certain implementations, multitasking and parallel processing may be advantageous. Accordingly, other implementations are within the scope of the following claims.

What is claimed is:

1. A method for mapping geologic data performed with one or more computing systems, the method comprising:
   receiving, through a user interface, a selection of a template describing a theoretical geologic depositional profile representing an arrangement of a plurality of theoretical geologic facies;
   receiving, through the user interface, a plurality of a paleo-elevations or paleo-depths relative to sea level of an actual facies in an actual geologic depositional profile, the plurality of paleo-elevations or paleo-depths relative to sea level of the actual facies determined by logging a wellbore formed through the actual facies in the actual geologic depositional profile;
   mapping, via a deterministic simulation algorithm based on Walther's Law, the received plurality of paleo-elevations or paleo-depths to the theoretical geologic profile by interpolating or extrapolating or both the theoretical geologic profile based on the received plurality of paleo-elevations or paleo-depths;
   generating a graphical map representing the actual geologic depositional profile based on the mapping, the graphical map comprising a paleo-environmental or paleo-elevational ramp; and
   displaying the generated graphical map in the user interface.

2. The method of claim 1, further comprising generating a plurality of templates that each describes a corresponding theoretical geologic profile representing a corresponding arrangement of a plurality of theoretical geologic facies, the plurality of templates including the selected template.

3. The method of claim 2, wherein receiving the selection of the template comprises presenting in the user interface a plurality of unique templates comprising a plurality of theoretical geologic depositional systems, wherein the received selection is one of the plurality of unique templates.

4. The method of claim 1, further comprising, in response to receiving the selection of the template, displaying an image of the theoretical geologic depositional profile in the user interface.

5. The method of claim 1, wherein mapping the paleo-elevations or the paleo-depths of the actual facies to the theoretical geologic profile comprises correlating the received paleo-elevations or paleo-depths of the actual facies to the theoretical geologic facies.

6. The method of claim 5, further comprising:
   receiving, in the user interface, another paleo-elevation or paleo-depth of another actual facies in the actual geologic depositional profile; and
   correlating the other paleo-elevation or paleo-depth to the theoretical geologic facies.

7. The method of claim 6, wherein correlating the received paleo-elevation or paleo-depth of the actual facies to the theoretical geologic facies comprises determining a corresponding theoretical paleo-elevation or paleo-depth for a theoretical facies in the theoretical geologic profile that corresponds to the actual facies.

8. The method of claim 7, wherein determining the corresponding paleo-elevation or paleo-depth comprises interpolating the theoretical paleo-elevation or paleo-depth for the corresponding theoretical facies based on the received paleo-elevation or paleo-depth.

9. The method of claim 7, wherein determining the corresponding paleo-elevation or paleo-depth comprises extrapolating the theoretical paleo-elevation or paleo-depth for the corresponding theoretical facies based on the received paleo-elevation or paleo-depth.

10. The method of claim 1, wherein mapping the plurality of paleo-elevations or paleo-depths to the theoretical geologic profile comprises building a table having at least one of a row or column including descriptions of the plurality of actual geologic facies and at least one of a corresponding row or column including the corresponding paleo-elevations or paleo-depths.

11. The method of claim 1, further comprising:
   receiving input to position one or more secondary facies in the actual geologic depositional profile; and
   in response to receiving the input, displaying one or more objects that represent corresponding one or more secondary facies in the graphical map.

12. The method of claim 11, wherein the one or more secondary facies comprises at least one of a river, a submarine fan, or a channel.

13. The method of claim 11, further comprising modeling the one or more secondary facies based on object metrics included in the selected template.

14. The method of claim 1, wherein mapping comprises associating the received plurality of paleo-elevations or paleo-depths to the geological profile as a regional variable of non-random successive primary facies.

15. An apparatus comprising a non-transitory and tangible computer readable media, the media comprising instructions operable when executed to cause one or more computing systems to perform operations comprising:
   receiving, through a user interface, a selection of a template describing a theoretical geologic depositional profile representing an arrangement of a plurality of theoretical geologic facies;
   receiving, through the user interface, a plurality of a paleo-elevations or paleo-depths relative to sea level of an actual facies in an actual geologic depositional profile, the plurality of paleo-elevations or paleo-depths relative to sea level of the actual facies determined by logging a wellbore formed through the actual facies in the actual geologic depositional profile;
   mapping, via a deterministic simulation algorithm based on Walther's Law, the received plurality of paleo-elevations or paleo-depths to the theoretical geologic profile by interpolating or extrapolating or both the theoretical geologic profile based on the received plurality of paleo-elevations or paleo-depths;
   generating a graphical map representing the actual geologic depositional profile based on the mapping, the graphical map comprising a paleo-environmental or paleo-elevational ramp; and displaying the generated graphical map in the user interface.

16. The apparatus of claim 15, wherein the operations further comprise generating a plurality of templates that each describes a corresponding theoretical geologic profile representing a corresponding arrangement of a plurality of theoretical geologic facies, the plurality of templates including the selected template.

17. The apparatus of claim 16, wherein receiving the selection of the template comprises presenting in the user interface a plurality of unique templates comprising a plurality of theoretical geologic depositional systems, wherein the received selection is one of the plurality of unique templates.

18. The apparatus of claim 15, wherein mapping comprises associating the received plurality of paleo-elevations or paleo-depths to the geological profile as a regional variable of non-random successive primary facies.

19. A computing system, comprising:
one or more memory modules;
one or more processors;
a graphical user interface; and
a geologic mapping tool stored on one or more of the memory modules, the geologic mapping tool operable when executed by the one or more processors to perform operations comprising:
receiving, through the graphical user interface, a selection of a template describing a theoretical geologic depositional profile representing an arrangement of a plurality of theoretical geologic facies;
receiving, through the user interface, a plurality of a paleo-elevations or paleo-depths relative to sea level of an actual facies in an actual geologic depositional profile, the plurality of paleo-elevations or paleo-depths relative to sea level of the actual facies determined by logging a wellbore formed through the actual facies in the actual geologic depositional profile;

mapping, via a deterministic simulation algorithm based on Walther's Law, the received plurality of paleo-elevations or paleo-depths to the theoretical geologic profile by interpolating or extrapolating or both the theoretical geologic profile based on the received plurality of paleo-elevations or paleo-depths;

generating a graphical map representing the actual geologic depositional profile based on the mapping, the graphical map comprising a paleo-environmental or paleo-elevational ramp; and displaying the generated graphical map in the graphical user interface.

20. The system of claim 19, wherein the operations further comprise generating a plurality of templates that each describes a corresponding theoretical geologic profile representing a corresponding arrangement of a plurality of theoretical geologic facies, the plurality of templates including the selected template.

21. The system of claim 20, wherein receiving the selection of the template comprises presenting in the graphical user interface a plurality of unique templates comprising a plurality of theoretical geologic depositional systems, wherein the received selection is one of the plurality of unique templates.

22. The system of claim 19, wherein mapping comprises associating the received plurality of paleo-elevations or paleo-depths to the geological profile as a regional variable of non-random successive primary facies.

* * * * *